June 2, 1931.　　　J. CHALUMEAU　　　1,808,130
SHOCK ABSORBER
Filed Aug. 18, 1930
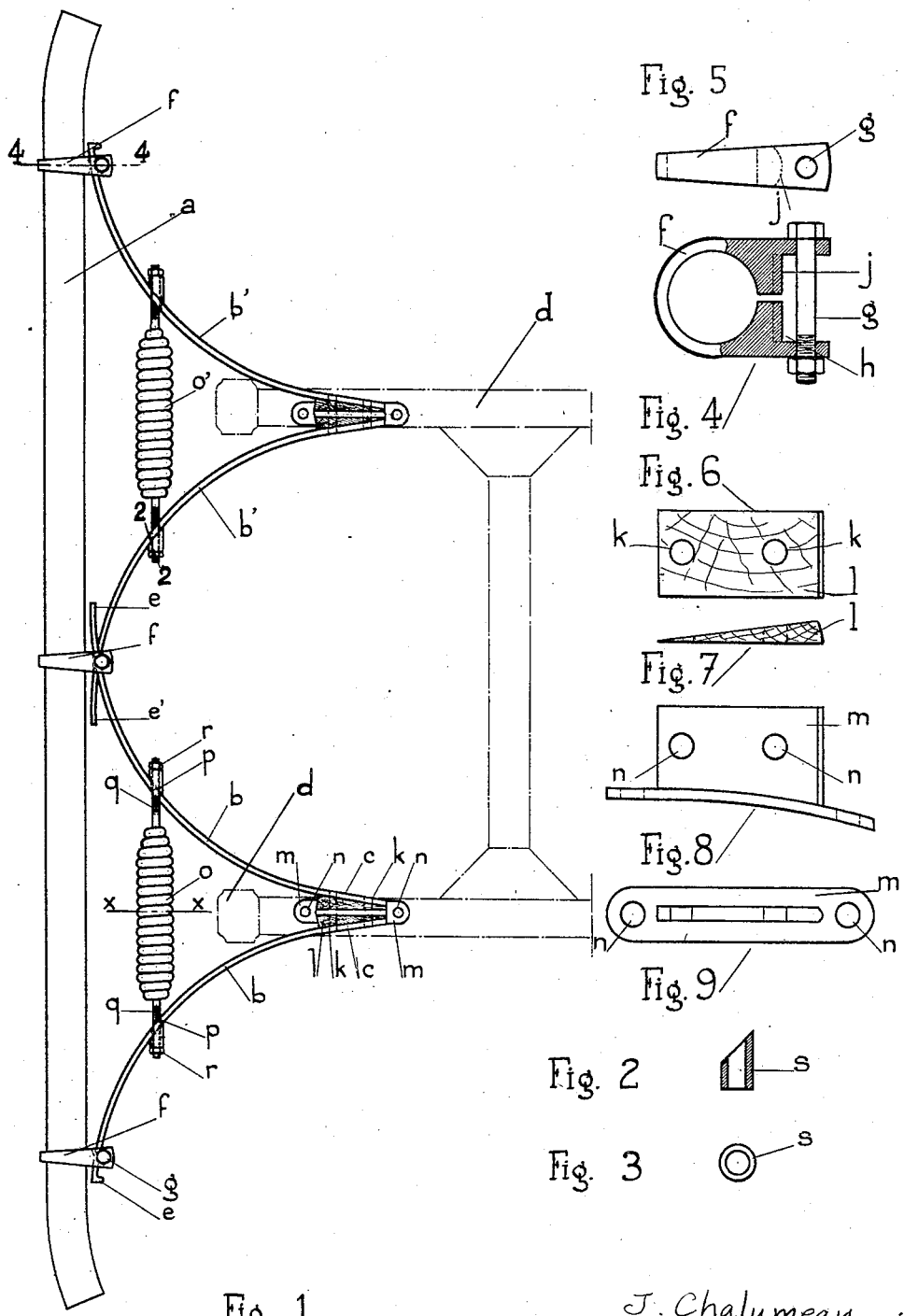
J. Chalumeau
INVENTOR Patented June 2, 1931

1,808,130

UNITED STATES PATENT OFFICE

JULES CHALUMEAU, OF PARIS, FRANCE

SHOCK-ABSORBER

Application filed August 18, 1930, Serial No. 476,100, and in France August 23, 1929.

My invention relates to a shock-absorber more particularly intended to reduce the shock of an obstacle, movable or not, against a motor vehicle and its object is to give resiliency to the shock-receiving bar which is usually placed at the fore end of such a vehicle. The present device is formed by springs fixed at one end to one of the parts between which shock is to be absorbed and adapted, while yielding, to slide along the other part and by tensile springs attached to the former springs so as to be drawn by them during the sliding movement thereof.

In the accompanying drawings which illustrate diagrammatically an embodiment of the present device given by way of example:

Figure 1 is a plan view of a shock-receiving bar provided with the springs according to the invention;

Figure 2 is an axial section on an enlarged scale along line 2—2 of Figure 1, showing a member for connecting the springs together, and Figure 3 is an end view of said member;

Figure 4 is an enlarged section along line 4—4 of Figure 1, showing a member for attaching a curved spring to the bar, and Figure 5 is a plan view of said member;

Figures 6, 7, 8 and 9 are enlarged views showing details of the attachment of the curved springs together and to the part to be protected.

At the fore-end of the chassis of a motor vehicle is placed the usual shock-receiving bar $a$. Curved flat springs $b$ are, at one end $c$, connected together and to a part of the chassis indicated by $d$. The other ends $e$ pass freely through collars $f$ held tightly to the bar $a$ by means of bolts $g$. A free interval $h$ (Figures 4 and 5) is left between the bolt $g$ and a rounded portion $j$ of the collar, for the passage of said spring. The opposite ends $c$ of the two springs $b$ are held by bolts $k$ to wedge members $l$ (Figures 6 and 7) and to a supporting square member $m$ which is fixed to the part $d$ of the chassis by means of bolts $n$ (Figures 8 and 9).

Between the curved springs $b$ is attached a coil spring $o$ which is extended at each end by a stem $q$ passing into a hole $p$ formed in the spring $b$ and held by a nut $r$. A cylindrical member $s$ (Figures 2 and 3) is adapted to be held by the nut $r$ against the spring $b$, one base of the cylindrical member $s$ being cut at an incline in conformity with the spring $b$. All the above details of Figures 2 to 9 need not be more fully described as they form no essential part of the invention and may, of course, vary considerably.

The operation is as follows:—

When a shock occurs on the bar $a$, the curved springs $b$ yield in a direction substantially perpendicular to said bar and at the same time their free ends $e$ sliding in the collars $f$, move away from the axis $x$ in a direction substantially parallel to the bar $a$. The said two perpendicular and parallel movements cause stretching of the tensile spring $o$, and the shock is yieldingly absorbed by the action of both sorts of springs $b$ and $o$.

Other groups of springs $b'$ $o'$ may be arranged likewise along the bar $a$, and the free ends $e$ $e'$ of the springs $b$ $b'$ are then crossed through the interval $h$ of the collar $f$, as shown in the middle portion of Figure 1, the free ends moving in opposite directions.

The present device, when combined with a horizontal shock-receiving part, absorbs shocks in a substantially horizontal plane and operates, as explained, both in a direction parallel and a direction perpendicular to said part. It may also be combined to absorb shocks in a vertical or other direction. For instance it may be mounted between the wheel-axle and the chassis of a vehicle, the fixed ends $c$ being attached to the axle and the sliding ends $e$ to the chassis, or conversely.

The invention permits of absorbing rapidly the kinetic energy due to the movement either of the part provided with the absorber or of an object exterior to said part, or of both. As it follows from the above description, the invention, within the scope of the claims, is not restricted to any of the details described.

What I claim is:—

1. In a shock-absorber, a plurality of springs fixed at one end to one of the parts between which shock is to be absorbed and adapted to slide freely along the other part, and a plurality of tensile springs attached at their two ends to two of the former springs.

2. In combination with the shock-receiving bar of a shock-absorber, a plurality of curved springs fixed at one end to the part to be protected and adapted to slide freely at their other end along the said bar, and a plurality of tensile springs attached at their two ends to two of said curved springs, whereby shock is absorbed by sliding and flexion of the curved springs and by tension of the tensile springs.

In testimony whereof I affix my signature.

JULES CHALUMEAU.